(12) United States Patent
Drost et al.

(10) Patent No.: US 7,715,420 B1
(45) Date of Patent: May 11, 2010

(54) METHOD AND APPARATUS FOR REFRESHING RECEIVER CIRCUITS USING EXTRA COMMUNICATION BITS

(75) Inventors: Robert J. Drost, Los Altos, CA (US); Ronald Ho, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 408 days.

(21) Appl. No.: 11/651,222

(22) Filed: Jan. 5, 2007

Related U.S. Application Data

(60) Provisional application No. 60/756,780, filed on Jan. 6, 2006.

(51) Int. Cl.
*H04L 12/28* (2006.01)
(52) U.S. Cl. .................. 370/419; 324/765; 365/201
(58) Field of Classification Search .......... 370/386; 365/145, 189.15; 324/765
See application file for complete search history.

(56) References Cited

U.S. PATENT DOCUMENTS

| | | | |
|---|---|---|---|
| 5,798,961 A * | 8/1998 | Heyden et al. ............ 365/52 |
| 5,864,414 A * | 1/1999 | Barnsley et al. ........... 398/71 |
| 5,912,835 A * | 6/1999 | Katoh ...................... 365/145 |
| 5,949,719 A * | 9/1999 | Clinton et al. ........ 365/189.15 |
| 6,301,184 B1 * | 10/2001 | Sasaki et al. ............. 365/226 |
| 6,665,225 B2 * | 12/2003 | Tsujino .................... 365/222 |
| 6,686,860 B2 * | 2/2004 | Gulati et al. .............. 341/155 |
| 6,756,805 B2 * | 6/2004 | Sher et al. ................. 324/765 |
| 6,876,652 B1 * | 4/2005 | Bell et al. ................. 370/386 |
| 6,934,749 B1 * | 8/2005 | Black et al. ............... 709/224 |
| 7,002,397 B2 * | 2/2006 | Kubo et al. ............... 327/534 |
| 7,046,562 B2 * | 5/2006 | Roohparvar .............. 365/201 |
| 7,359,322 B2 * | 4/2008 | Khurana et al. ........... 370/230 |
| 7,483,411 B2 * | 1/2009 | Weinstein et al. ......... 370/338 |
| 2006/0193248 A1 * | 8/2006 | Filsfils et al. ............. 370/216 |

* cited by examiner

*Primary Examiner*—Thong H Vu
(74) *Attorney, Agent, or Firm*—Park, Vaughan & Fleming LLP

(57) ABSTRACT

One embodiment of the present invention provides a system that facilitates biasing receiver circuits within an integrated circuit. During operation, the system provides n receiver circuits within the integrated circuit to be biased. Next, the system provides n+m communication channels between n drivers and n receivers, wherein m is a number of additional communication channels, and wherein m>0. Then, the system couples the n+m communication channels to the n drivers, wherein each driver is selectively coupled to m+1 communication channels. The system also couples the n+m communication channels to the n receivers, wherein each receiver is selectively coupled to m+1 communication channels. In this way, at any given time n of the communication channels are active and m of the communication channels are inactive. Finally, the system refreshes inactive m communication channels' biases while the m inactive communication channels are not communicating signals.

24 Claims, 8 Drawing Sheets

METHOD AND APPARATUS FOR REFRESHING RECEIVER CIRCUITS USING EXTRA COMMUNICATION BITS

RELATED APPLICATION

This application claims priority under 35 U.S.C. §119(e) to U.S. Provisional Application Ser. No. 60/756,780, entitled "Refreshing receivers using extra bits," filed on Jan. 6, 2006, the contents of which are herein incorporated by reference.

GOVERNMENT LICENSE RIGHTS

This invention was made with United States Government support under Contract No. NBCH3039002 awarded by the Defense Advanced Research Projects Administration. The United States Government has certain rights in the invention.

BACKGROUND

1. Field of the Invention

The present invention relates to integrated circuits. More specifically, the present invention relates to a method and an apparatus for using extra communication bits to refresh receiver circuits without exposing the refresh mechanism to the architecture and without suffering a bandwidth penalty.

2. Related Art

Typical communication systems can be decomposed into three parts: a driver, a channel, and a receiver. Each part has at least one and often many bits running in parallel. For example, an on-chip bus from a memory to an arithmetic unit can be a 64-bit system, with 64 drivers, a 64-bit wire bus as the channel, and 64 receivers. In another example, an optical system between switch line cards can be a 4-bit system, with 4 lasers, a single optical fiber channel with four wavelengths, and 4 optical receiver diodes.

In communication systems using capacitively-coupled or inductively-coupled inputs (such as those based on Proximity Communication) or on-chip capacitive or inductive coupling, the receiver's inputs need to be set up (or biased) to a preferred mode of operation. This may be performed, for example, to set the receiver threshold between the digital values of "0" and "1", to increase its signal sensitivity, to decrease its delay, or to reduce its power consumption.

This biasing, or refreshing, can be performed periodically. During this refreshing, the inputs get pre-charged to the right bias before each data item is received, or post-charged to the right bias after each data item is received. However, such pre/post-charge circuits tend to be power-inefficient because they typically operate on every single data item. Furthermore, they typically limit data rates because the receiver has only half the bit period to actually receive the data; the other half of the bit period is spent refreshing. Finally, refreshing every cycle is often unnecessary, as the bias may degrade only as a result of secondary effects such as leakage. Thus, bias schemes that operate more infrequently can be desirable.

Biasing a receiver infrequently is most simply accomplished by building an "every-cycle" bias circuit and squelching the bias circuit most of the time. However, this raises the problem of architectural exposure. In this example, higher-level control structures need to be aware of when and how long the channel refreshes. In other words, a system designed to refresh after 100 data items requires the next bits to pause while the system refreshes all of its receivers. Moreover, this increases complexity in the control mechanism, and it costs bandwidth. For example, if the refresh takes the same time as ten communicated data items, the bandwidth cost for refresh is 10%. Additionally, some refreshing (to establish a threshold voltage for a non-DC-balanced data stream, for instance) may require transmitting a special mid-level signal during the refresh, making it difficult to refresh in a single bit period or less.

Hence, what is needed is a bias mechanism that does not suffer from the problems described above.

SUMMARY

One embodiment of the present invention provides a system that facilitates biasing receiver circuits within an integrated circuit. During operation, the system provides n receiver circuits within the integrated circuit to be biased. Next, the system provides n+m communication channels between n drivers and n receivers, wherein m is a number of additional communication channels, and wherein m>0. Then, the system couples the n+m communication channels to the n drivers, wherein each driver is selectively coupled to m+1 communication channels. The system also couples the n+m communication channels to the n receivers, wherein each receiver is selectively coupled to m+1 communication channels. In this way, at any given time n of the communication channels are active and m of the communication channels are inactive. Finally, the system refreshes inactive m communication channels' biases while the m inactive communication channels are not communicating signals.

In a variation on this embodiment, the system couples the n+m communication channels to the n drivers through a switch between each of the n drivers and the n+m communication channels. The system also couples the n+m communication channels to the n receivers through a switch between each of the n+m communication channels and the n receivers.

In a further variation, the system periodically reconfigures the switches to facilitate refreshing alternate communication channels, so that each of the n+m communication channels will eventually be refreshed.

In a further variation, reconfiguring the switches involves reconfiguring the switches in a single clock cycle between sample instance times so that timing and voltage margins are maintained for bits being sampled at receivers on the communication channels that are active after the switching.

In a variation on this embodiment, the system makes a communication channel that is being refreshed ($C_R$) operational in parallel with an operating communication channel ($C_O$) for one or more clock cycles, wherein $C_R$ eventually replaces $C_O$ as the operating communication channel. Note that operating $C_R$ and $C_O$ in parallel prior to switching $C_R$ to the active communication channel minimizes switching effects.

In a variation on this embodiment, refreshing the m inactive communication channels' biases involves sending a refresh signal on the m inactive communication channels from the transmit side.

In a variation on this embodiment, the system includes n+m drivers which are located after the switches so that each of the n+m communication channels has its own driver.

In a variation on this embodiment, the system includes n+m receivers which are located before the switches so that each of the n+m communication channels has its own receiver.

DETAILED DESCRIPTION

Figure 1:
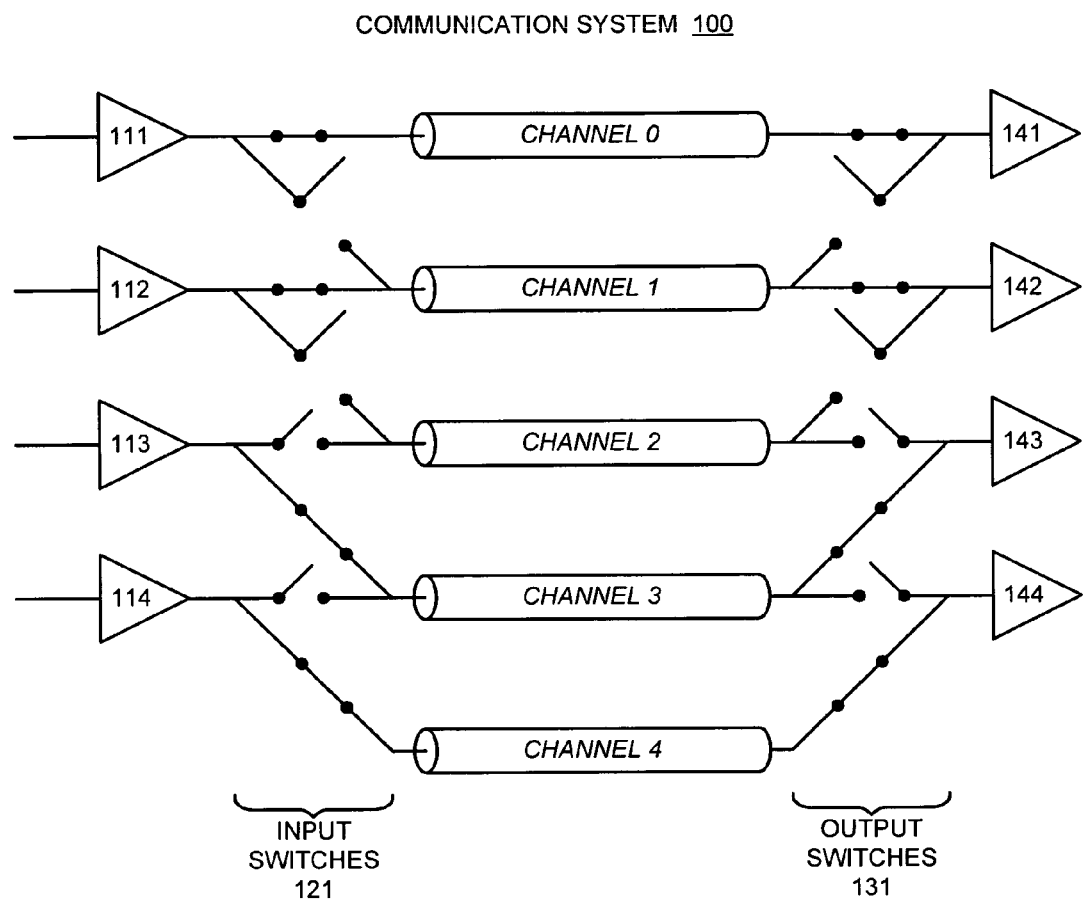
FIG. 1 illustrates a 4-bit communication system with five communication channels in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates biasing receiver circuits within an integrated circuit. Note that the phrases "biasing receiver circuits," "refreshing receiver circuits," "refreshing the communication channels," and "refreshing the communication channel's biases" are all used interchangeably throughout this specification, and all refer to the same serious of events. Also note that embodiments of the present invention are implemented within proximity communication systems as described in U.S. Pat. No. 6,500,696, entitled "Face-to-Face Chips," and U.S. patent application Ser. No. 10/953,008, entitled "Method and Apparatus for Driving On-Chip Wires through Capacitive Coupling". For example, one embodiment of the present invention can be implemented on a system with capacitively-coupled inputs, while another embodiment of the present invention can be implemented on a system with inductively-coupled inputs.

During operation, the system identifies n receiver circuits within the integrated circuit to be biased. Next, the system provides n+m communication channels between n drivers and n receivers, wherein m is a number of additional communication channels, and wherein m>0. Then, the system couples the n+m communication channels to the n drivers, wherein each driver in the n drivers is selectively coupled to m+1 communication channels. The system also couples the n+m communication channels to the n receivers, wherein each receiver in the n receivers is selectively coupled to m+1 communication channels. In this way, at any given time n of the communication channels are active and m of the communication channels are inactive. Finally, the system refreshes m inactive communication channels' biases while the m inactive communication channels are not communicating signals. Note that the system can rotate the m inactive communication channels between the n+m communication channels to refresh each communication channel as needed.

Note that as the value of m increases, the number of communication channels that can be refreshed simultaneously increases. However, as m increases, the number of switches necessary to implement the system also increases. This can add a significant amount of complexity and cost to the system. In addition, the increasing value of m results in increased parasitic capacitance (or inductance).

One embodiment of the present invention allows the receivers to be refreshed periodically without exposing the refresh mechanism to the architecture. As far as any surrounding circuits are concerned, the bits are never taken off-line to be refreshed, and so the existence of a "pause" mechanism is not necessary. In addition, this embodiment eliminates the bandwidth penalty for performing a refresh, because the system always has n channels for full-bandwidth communication. Furthermore, this embodiment allows for a slow refresh that can take multiple clock cycles, allowing for small refresh circuits that consume very little power.

Exemplary 4-Bit Communication System

FIG. 1 illustrates a 4-bit communication system 100 with five communication channels in accordance with an embodiment of the present invention. Communication system 100 includes drivers 111-114, input switches 121, output switches 131, and receivers 141-144. Note that input switches 121 selectively couple drivers 111-114 to communication channels 0-4, and output switches 131 selectively couple communication channels 0-4 to receivers 141-144. In communication system 100, n=4, and m=1. In other words, communication system 100 is a 4-bit communication system that includes 1 additional bit for refreshing receiver circuits.

As illustrated in FIG. 1, driver 111 is coupled to receiver 141 via communication channel 0, driver 112 is coupled to receiver 142 via communication channel 1, driver 113 is coupled to receiver 143 via communication channel 3, and driver 114 is coupled to receiver 144 via communication channel 4. Communication channel 2 is currently inactive, and is undergoing a refresh operation.

Exemplary Communication System with an Additional Driver

Figure 2:
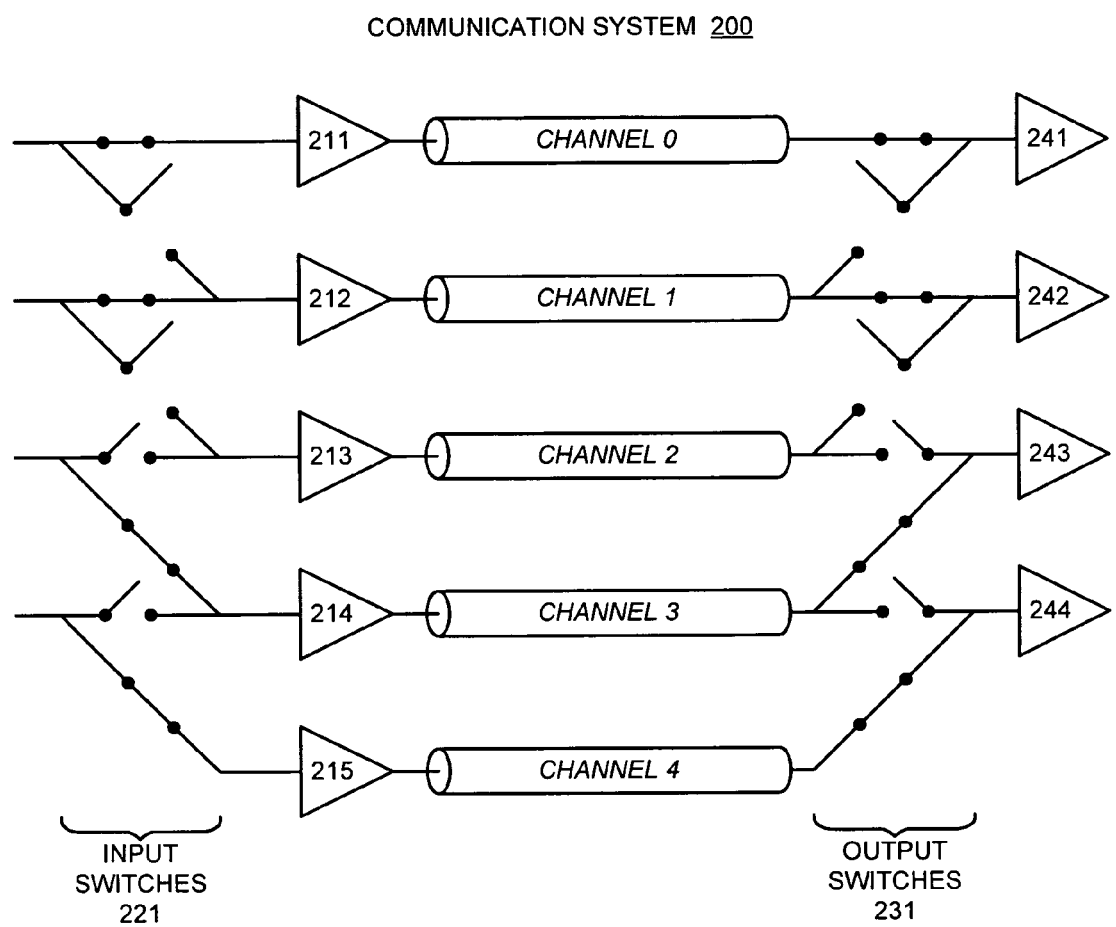
FIG. 2 illustrates a 4-bit communication system with five communication channels, wherein the input switches are located prior to the drivers in accordance with an embodiment of the present invention.

FIG. 2 illustrates a 4-bit communication system 200 with five communication channels, wherein the input switches 221 are located prior to drivers 211-215 in accordance with an embodiment of the present invention. Communication system 200 includes drivers 211-215, input switches 221, output switches 231, and receivers 241-244. Note that output switches 231 selectively couple communication channels 0-4 to receivers 241-244. In communication system 200, n=4, and m=1. In other words, communication system 200 is a 4-bit communication system that includes 1 additional bit for refreshing receiver circuits.

As illustrated in FIG. 2, driver 211 is coupled to receiver 241 via communication channel 0, driver 212 is coupled to receiver 242 via communication channel 1, driver 214 is coupled to receiver 243 via communication channel 3, and driver 215 is coupled to receiver 244 via communication channel 4. Communication channel 2 is currently inactive, and is undergoing a refresh operation. Note that driver 213 is coupled to inactive communication channel 2.

In this embodiment, each communication channel has its own driver, and the transmitters for the four bits are selectively coupled to the five drivers 211-215 via input switches 221. Note that placing drivers 211-215 after input switches 221 facilitates faster drivers with lower power requirements. Note that drivers 111-114 in communication system 100 must drive the extra parasitic capacitance (or inductance) of input switches 121, which reduce input switches' 121 effective logical effort and increasing input switches' 121 delay as compared to input switches 221.

Exemplary Communication System with an Additional Receiver

Figure 3:
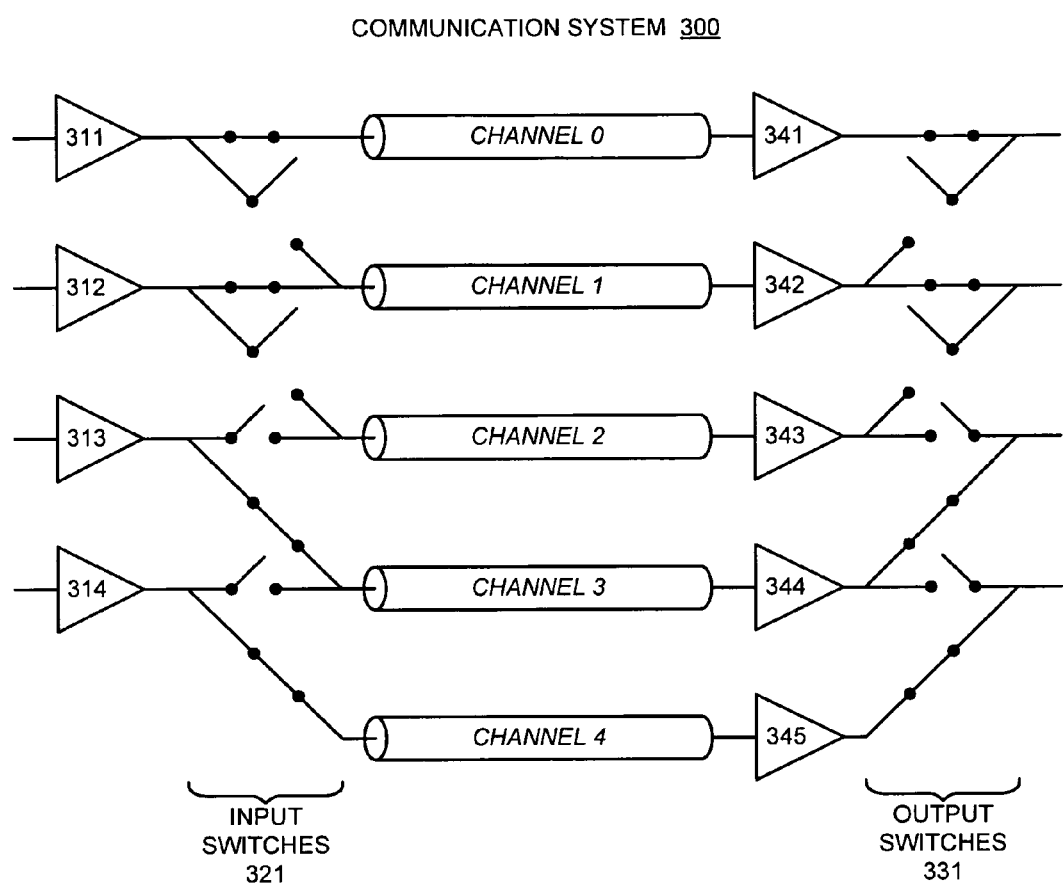
FIG. 3 illustrates a 4-bit communication system with five communication channels, wherein the receivers are located prior to the output switches in accordance with an embodiment of the present invention.

FIG. 3 illustrates a 4-bit communication system 300 with five communication channels, wherein the receivers are located prior to output switches 331 in accordance with an embodiment of the present invention. Communication system 300 includes drivers 311-314, input switches 321, output switches 331, and receivers 341-345. Note that input switches 321 selectively couple drivers 311-314 to communication channels 0-4. In communication system 300, n=4, and m=1. In other words, communication system 300 is a 4-bit communication system that includes 1 additional bit for refreshing receiver circuits.

As illustrated in FIG. 3, driver 311 is coupled to receiver 341 via communication channel 0, driver 312 is coupled to receiver 342 via communication channel 1, driver 313 is coupled to receiver 344 via communication channel 3, and driver 314 is coupled to receiver 345 via communication channel 4. Communication channel 2 is currently inactive, and is undergoing a refresh operation. Note that receiver 343 is coupled to inactive communication channel 2.

In this embodiment, each communication channel has its own receiver, and the receiver logic for the four bits are selectively coupled to the five receivers 341-345 via output switches 331. Note that placing receivers 311-315 before output switches 331 keeps output switches 331 from interfering with the data signals, which could be low-swing, for example.

Exemplary Communication System with an Additional Driver and Receiver

Figure 4:
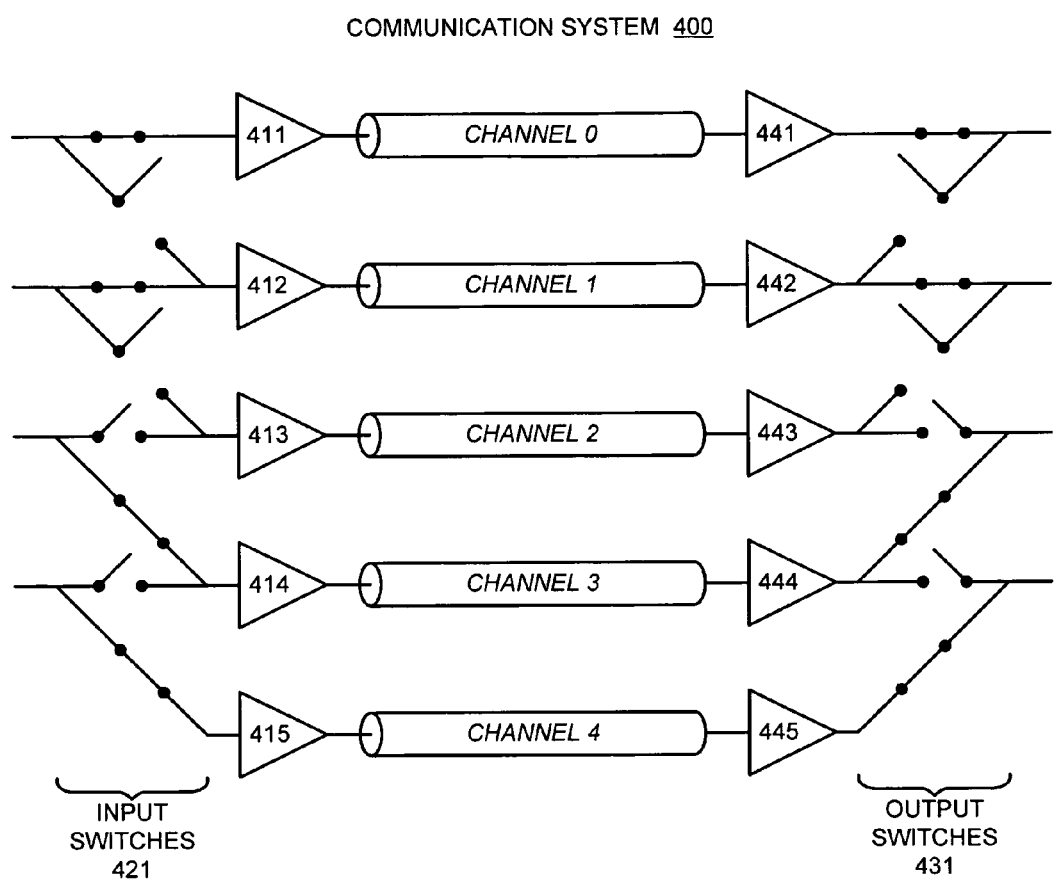
FIG. 4 illustrates a 4-bit communication system with five communication channels, wherein the input switches are located prior to the drivers, and wherein the receivers are located prior to the output switches in accordance with an embodiment of the present invention.

FIG. 4 illustrates a 4-bit communication system 400 with five communication channels, wherein the input switches 421 are located prior to drivers 411-415, and wherein the receivers 441-445 are located prior to the output switches 431 in accordance with an embodiment of the present invention.

As illustrated in FIG. 4, driver 411 is coupled to receiver 441 via communication channel 0, driver 412 is coupled to receiver 442 via communication channel 1, driver 414 is coupled to receiver 444 via communication channel 3, and driver 415 is coupled to receiver 445 via communication channel 4. Communication channel 2 is currently inactive, and is undergoing a refresh operation. Note that driver 413 and receiver 443 are coupled to inactive communication channel 2.

In this embodiment, each communication channel has its own driver and receiver. The transmitters for the four bits are selectively coupled to the five drivers 411-415 via input switches 421. The receiver logic for the four bits are selectively coupled to the five receivers 441-445 via output switches 431. Note that placing drivers 411-415 after input switches 421 facilitates faster drivers with lower power requirements. Note that drivers 111-114 in communication system 100 must drive the extra parasitic capacitance (or inductance) of input switches 121, which reduces input switches' 121 effective logical effort and increases input switches' 121 delay as compared to input switches 421. Furthermore, note that placing receivers 411-415 before output switches 431 keeps output switches 431 from interfering with the data signals, which could be low-swing, for example.

Communication System with Two Additional Communication Channels

Figure 5:
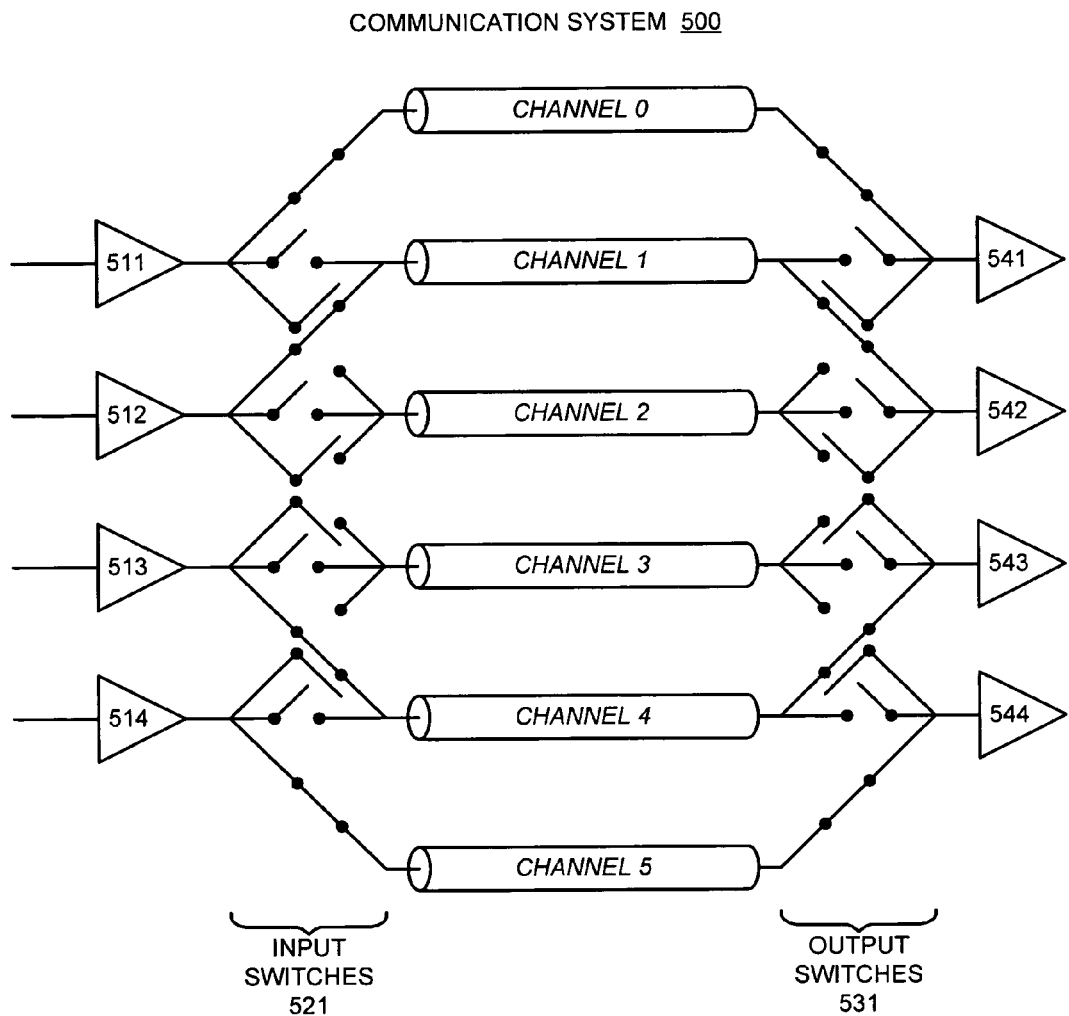
FIG. 5 illustrates a 4-bit communication system with six communication channels in accordance with an embodiment of the present invention.

FIG. 5 illustrates a 4-bit communication system 500 with six communication channels in accordance with an embodiment of the present invention. Communication system 500 includes drivers 511-514, input switches 521, output switches 531, and receivers 541-544. Note that input switches 521 selectively couple drivers 511-514 to communication channels 0-5, and output switches 531 selectively couple communication channels 0-5 to receivers 541-544. In communication system 500, n=4, and m=2. In other words, communication system 500 is a 4-bit communication system that includes 2 additional bits for refreshing receiver circuits.

As illustrated in FIG. 5, driver 511 is coupled to receiver 541 via communication channel 0, driver 512 is coupled to receiver 542 via communication channel 1, driver 513 is coupled to receiver 543 via communication channel 4, and driver 514 is coupled to receiver 544 via communication channel 5. Communication channels 2 and 3 are currently inactive, and are undergoing a refresh operation.

Biasing Receiver Circuits

Figure 6:
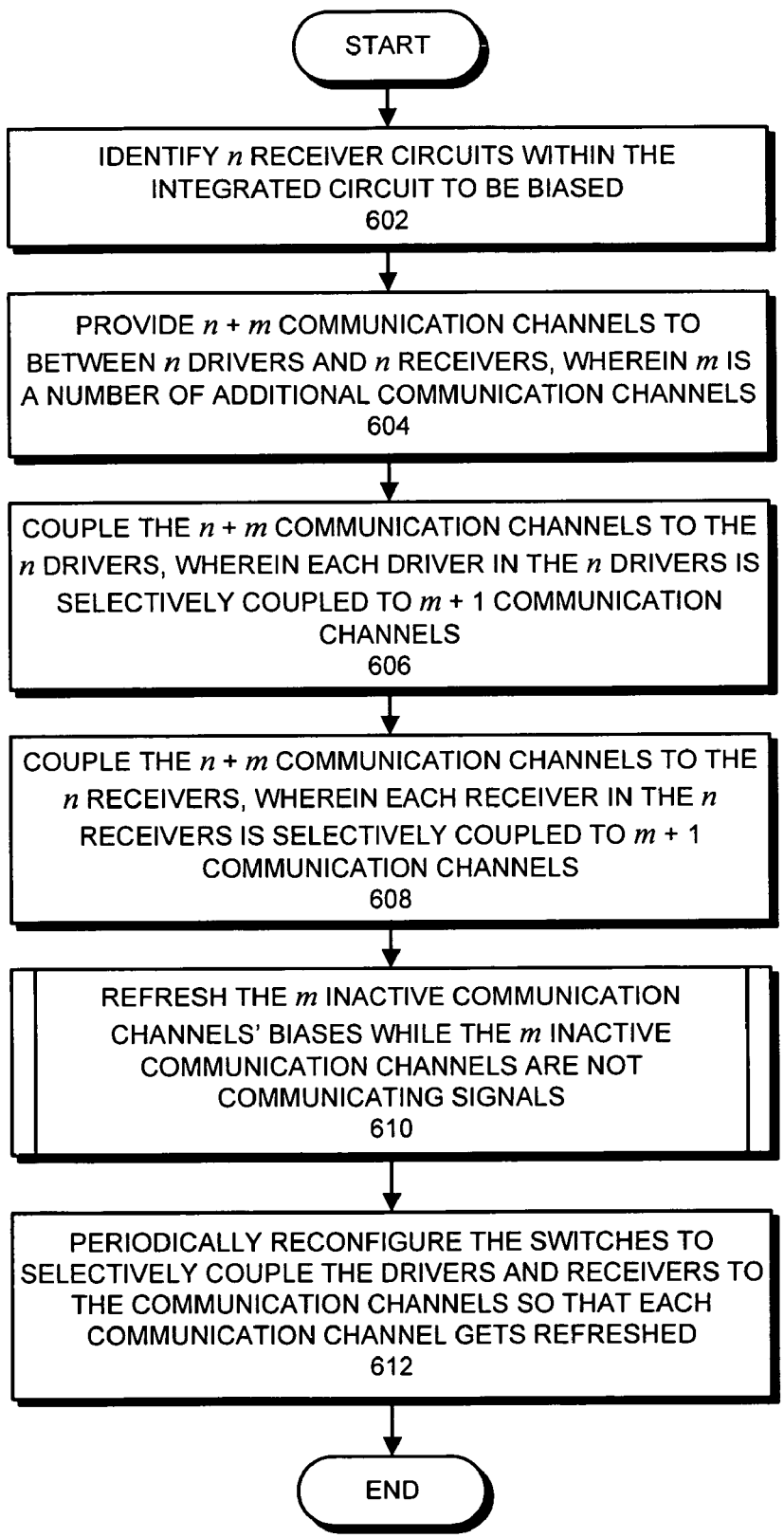
FIG. 6 presents a flowchart illustrating the process of biasing receiver circuits within an integrated circuit in accordance with an embodiment of the present invention.

FIG. 6 presents a flowchart illustrating the process of biasing receiver circuits within an integrated circuit in accordance with an embodiment of the present invention. The system starts by identifying n receiver circuits within the integrated circuit to be biased (step 602). Next, the system creates n+m communication channels between n drivers and n receivers, wherein m is a number of additional communication channels, and wherein m>0 (step 604).

Note that as the value of m increases, the number of communication channels that can be refreshed simultaneously increases. However, as m increases, the number of the number of switches necessary to implement the system also increases. This can add a significant amount of complexity and cost to the system. In addition, increasing values of m result in increased parasitic capacitance (or inductance).

Next, the system couples the n+m communication channels to the n drivers, wherein each driver in the n drivers is selectively coupled to m+1 communication channels (step 606). The system also couples the n+m communication channels to the n receivers, wherein each receiver in the n receivers is selectively coupled to m+1 communication channels (step 608). In this way, at any given time n of the communication channels are active and m of the communication channels are inactive.

The system then refreshes the m inactive communication channels' biases while the m inactive communication channels are not communicating signals (step 610). Note that this step is described in more detail in the description of FIGS. 7-9. Finally, the system periodically reconfigures the switches to selectively couple the drivers and the receivers to the communication channels so that each channel in the n+m communication channels gets refreshed (step 612).

Refreshing a Communication Channel's Bias within a Single Clock Cycle

Figure 7:
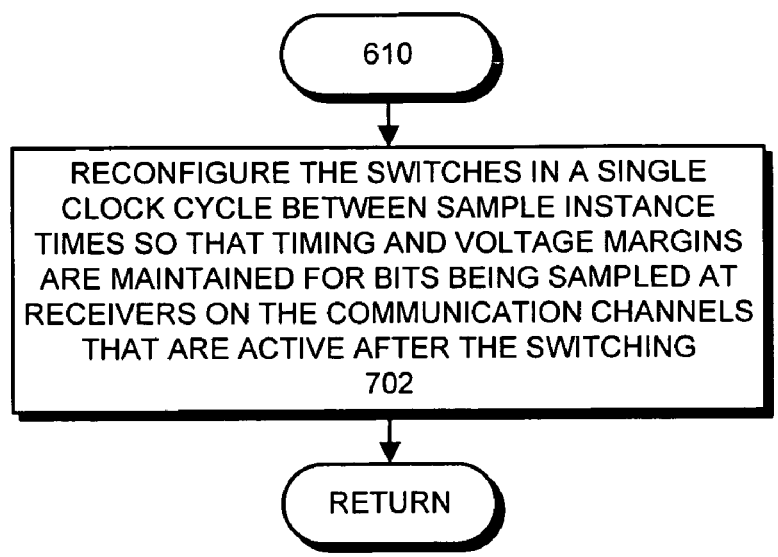
FIG. 7 presents a flowchart illustrating the process of refreshing a communication channel's bias within a single clock cycle in accordance with an embodiment of the present invention.

FIG. 7 presents a flowchart illustrating the process of refreshing a communication channel's bias within a single clock cycle in accordance with an embodiment of the present invention. In this embodiment, the system operates by reconfiguring the switches in a single clock cycle between sample instance times so that timing and voltage margins are maintained for bits being sampled at receivers on the communication channels that are active after the switching (step 702).

Refreshing a Communication Channel's Bias Over Multiple Clock Cycles

Figure 8:
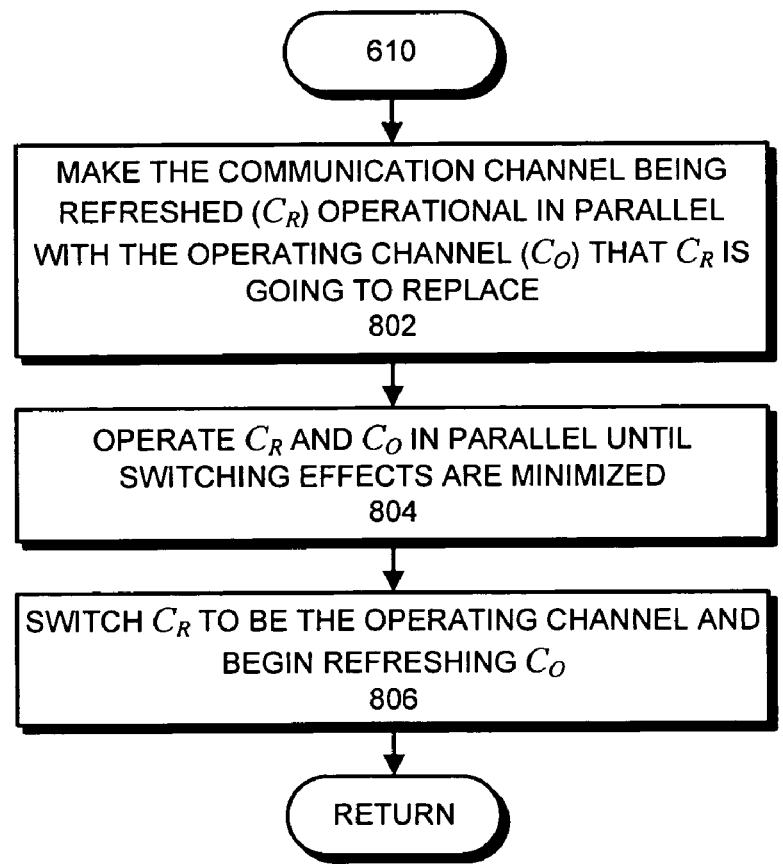
FIG. 8 presents a flowchart illustrating the process of refreshing a communication channel's bias over multiple clock cycles in accordance with an embodiment of the present invention.

FIG. 8 presents a flowchart illustrating the process of refreshing a communication channel's bias over multiple clock cycles in accordance with an embodiment of the present invention. The system operates by configuring the communication channel that is being refreshed ($C_R$) to be operational in parallel with an operating communication channel ($C_O$) that $C_R$ will eventually replace (step 802). The system then operates $C_R$ and $C_O$ in parallel until switching effects are minimized (step 804). Once any switching effects have settled, the swap can occur. This is a "make-before-break" operation. Finally, the system switches $C_R$ to be the new operating channel and begins refreshing $C_O$ (step 806).

Sending a Refresh Signal

Figure 9:
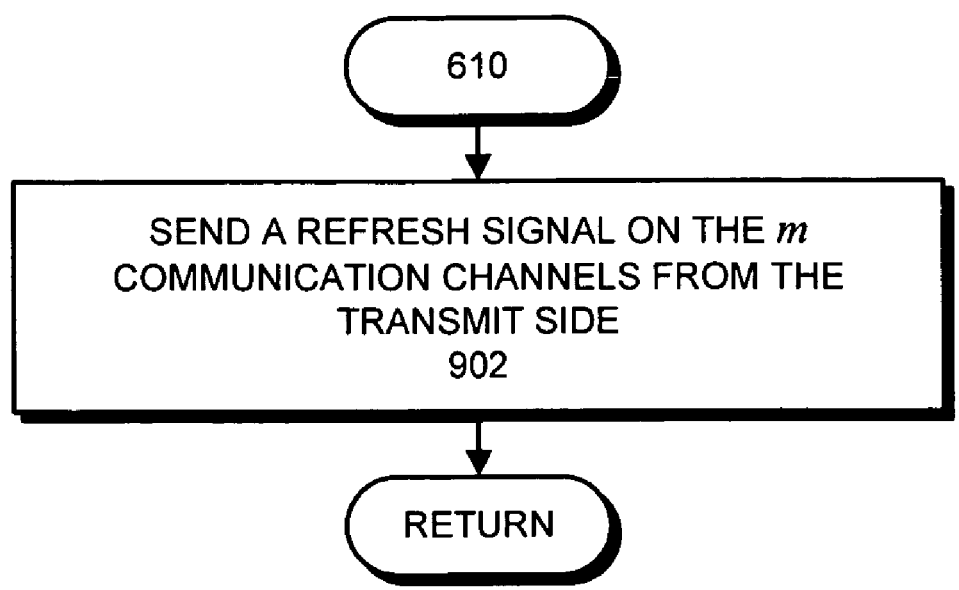
FIG. 9 presents a flowchart illustrating the process of sending a refresh signal in accordance with an embodiment of the present invention.

FIG. 9 presents a flowchart illustrating the process of sending a refresh signal in accordance with an embodiment of the present invention. The system operates by driving a refresh signal to the m communication channels from the transmit side of the communication system (step 902).

SUMMARY

As mentioned previously, one embodiment of the present invention provides a system that facilitates biasing receiver circuits within an integrated circuit. Embodiments of the present invention can be implemented in communication systems that use proximity communication. For example, one embodiment of the present invention is implemented on a system with capacitively-coupled inputs, while another embodiment of the present invention is implemented on a system with inductively-coupled inputs.

One embodiment of the present invention allows the receivers to be refreshed periodically without exposing the refresh mechanism to the architecture. As far as any surrounding circuits are concerned, the bits are never taken off-line to be refreshed, and so the existence of a "pause" mechanism is not necessary. In addition, this embodiment eliminates the bandwidth penalty for performing a refresh, because the system always has n channels to provide full-bandwidth communication. Furthermore, this embodiment allows for a slow refresh that can take multiple clock cycles, which allows for small refresh circuits that consume very little power.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for biasing receiver circuits within an integrated circuit, the method comprising:
   identifying n receiver circuits within the integrated circuit to be biased;
   providing n+m integrated communication channels between n drivers and n receivers, wherein a communication channel includes a DC-balanced wire that communicates a signal between a driver and a receiver, wherein m is a number of additional integrated communication channels, and wherein m>0;
   coupling the n+m integrated communication channels to the n drivers, wherein each of the n drivers can be selectively coupled to m+1 integrated communication channels;
   coupling the n+m integrated communication channels to the n receivers, wherein each of the n receivers can be selectively coupled to m+1 integrated communication channels;
   wherein the integrated communication channels are coupled so that n of the integrated communication channels are active and m of the integrated communication channels are inactive; and
   refreshing the m inactive integrated communication channels' biases while the m inactive integrated communication channels are not communicating signals.

2. The method of claim 1, further comprising:
   coupling the n+m integrated communication channels to the n drivers through a switch between each of the n drivers and the n+m integrated communication channels; and
   coupling the n+m integrated communication channels to the n receivers through a switch between each of the n+m integrated communication channels and the n receivers.

3. The method of claim 2, further comprising periodically reconfiguring the switches to facilitate refreshing alternate integrated communication channels, so that each of the n+m integrated communication channels will eventually be refreshed.

4. The method of claim 3, wherein reconfiguring the switches involves reconfiguring the switches in a single clock cycle between sample instance times so that timing and voltage margins are maintained for bits being sampled at receivers on the integrated communication channels that are active after the switching.

5. The method of claim 1, further comprising making an integrated communication channel that is being refreshed ($C_R$) operational in parallel with an operating integrated communication channel ($C_O$) for one or more clock cycles, wherein $C_R$ will eventually replace $C_O$ as the operating communication channel, and wherein operating $C_R$ and $C_O$ in parallel prior to switching $C_R$ to be an active communication channel minimizes switching effects.

6. The method of claim 1, wherein refreshing the m inactive integrated communication channels' biases involves sending a refresh signal on the m inactive integrated communication channels from the transmit side.

7. The method of claim 1, wherein the system includes n+m drivers which are located after the switches so that each integrated communication channel has its own driver.

8. The method of claim 1, wherein the system includes n+m receivers which are located before the switches so that each integrated communication channel has its own receiver.

9. An apparatus configured to bias receiver circuits within an integrated circuit, comprising:
- the integrated circuit;
- n drivers within the integrated circuit;
- n receivers within the integrated circuit;
- n+m integrated communication channels located between n drivers and n receivers, wherein a communication channel includes a DC-balanced wire that communicates a signal between a driver and a receiver, wherein m is a number of additional integrated communication channels, and wherein m>0;
- a coupling mechanism configured to couple the n+m integrated communication channels to the n drivers, wherein each driver in the n drivers can be selectively coupled to m+1 integrated communication channels;
- wherein the coupling mechanism is further configured to couple the n+m integrated communication channels to the n receivers, wherein each receiver in the n receivers can be selectively coupled to m+1 integrated communication channels; and
- wherein the coupling mechanism is further configured to couple integrated communication channels to drivers and receivers so that n of the integrated communication channels are active and m of the integrated communication channels are inactive; and
- a refresh mechanism configured to refresh the m inactive integrated communication channels' biases while the m inactive integrated communication channels are not communicating signals.

10. The apparatus of claim 9:
- wherein the coupling mechanism is further configured to couple the n+m integrated communication channels to the n drivers through a switch between each of the n drivers and the n+m integrated communication channels; and
- wherein the coupling mechanism is further configured to couple the n+m integrated communication channels to the n receivers through a switch between each of the n+m integrated communication channels and the n receivers.

11. The apparatus of claim 10, further comprising a switching mechanism configured to periodically reconfigure the switches to facilitate refreshing alternate integrated communication channels, so that each integrated communication channel will eventually be refreshed.

12. The apparatus of claim 11, wherein the switching mechanism is configured to reconfigure the switches in a single clock cycle between sample instance times so that timing and voltage margins are maintained for bits being sampled at receivers on the integrated communication channels that are active after the switching.

13. The apparatus of claim 9, wherein the coupling mechanism is configured to make an integrated communication channel that is being refreshed ($C_R$) operational in parallel with an operating integrated communication channel ($C_O$) for one or more clock cycles, wherein $C_R$ will eventually replace $C_O$ as the operating communication channel, and wherein operating $C_R$ and $C_O$ in parallel prior to switching $C_R$ to the active communication channel minimizes switching effects.

14. The apparatus of claim 9, wherein the refresh mechanism is configured to send a refresh signal on the m inactive integrated communication channels from the transmit side.

15. The apparatus of claim 9, wherein the n drivers are part of n+m drivers which are located after the switches so that each integrated communication channel has its own driver.

16. The apparatus of claim 9, wherein n receivers are part of n+m receivers which are located before the switches so that each integrated communication channel has its own receiver.

17. A computer system configured to bias receiver circuits, comprising:
- a processor;
- a memory;
- n drivers;
- n receivers;
- n+m integrated communication channels located between n drivers and n receivers, wherein a communication channel includes a DC-balanced wire that communicates a signal between a driver and a receiver, wherein m is a number of additional integrated communication channels, and wherein m>0;
- a coupling mechanism configured to couple the n+m integrated communication channels to the n drivers, wherein each driver in the n drivers can be selectively coupled to m+1 integrated communication channels;
- wherein the coupling mechanism is further configured to couple the n+m integrated communication channels to the n receivers, wherein each receiver in the n receivers can be selectively coupled to m+1 integrated communication channels; and
- wherein the coupling mechanism is further configured to couple integrated communication channels to drivers and receivers so that n of the integrated communication channels are active and m of the integrated communication channels are inactive; and
- a refresh mechanism configured to refresh the m inactive integrated communication channels' biases while the m inactive integrated communication channels are not communicating signals.

18. The computer system of claim 17:
- wherein the coupling mechanism is further configured to couple the n+m integrated communication channels to the n drivers through a switch between each of the n drivers and the n+m integrated communication channels; and
- wherein the coupling mechanism is further configured to couple the n+m integrated communication channels to the n receivers through a switch between each of the n+m integrated communication channels and the n receivers.

19. The computer system of claim 18, further comprising a switching mechanism configured to periodically reconfigure the switches to facilitate refreshing alternate integrated communication channels, so that each integrated communication channel will eventually be refreshed.

20. The computer system of claim 19, wherein the switching mechanism is configured to reconfigure the switches in a single clock cycle between sample instance times so that timing and voltage margins are maintained for bits being sampled at receivers on the integrated communication channels that are active after the switching.

21. The computer system of claim 17, wherein the coupling mechanism is configured to make a integrated communication channel that is being refreshed ($C_R$) operational in parallel with an operating integrated communication channel ($C_O$) for one or more clock cycles, wherein $C_R$ will eventually replace $C_O$ as the operating communication channel, and wherein operating $C_R$ and $C_O$ in parallel prior to switching $C_R$ to the active communication channel minimizes switching effects.

22. The computer system of claim 17, wherein the refresh mechanism is configured to send a refresh signal on the m inactive integrated communication channels from the transmit side.

23. The computer system of claim 17, wherein the n drivers are part of n+m drivers which are located after the switches so that each integrated communication channel has its own driver.

24. The computer system of claim 17, wherein n receivers are part of n+m receivers which are located before the switches so that each integrated communication channel has its own receiver.

* * * * *